April 14, 1959 W. GRZYWACZ 2,881,522
MECHANICAL DEVICE FOR DRAWING A HYPERBOLIC CURVE
Filed March 28, 1956 3 Sheets-Sheet 1
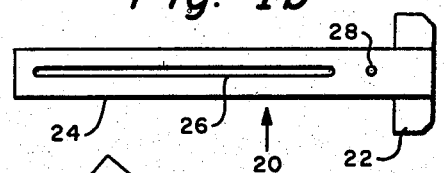
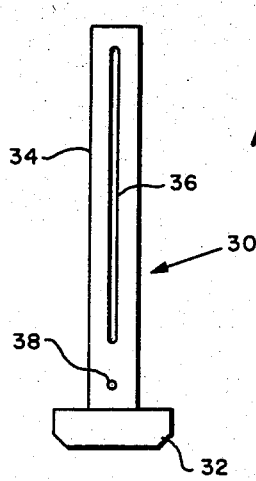
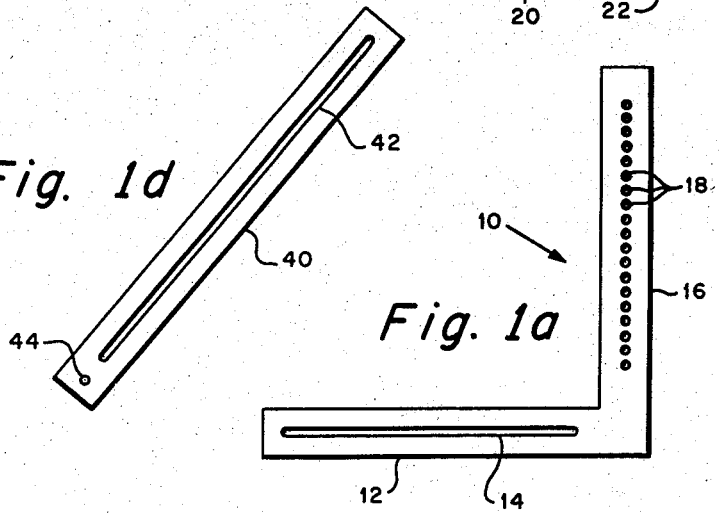
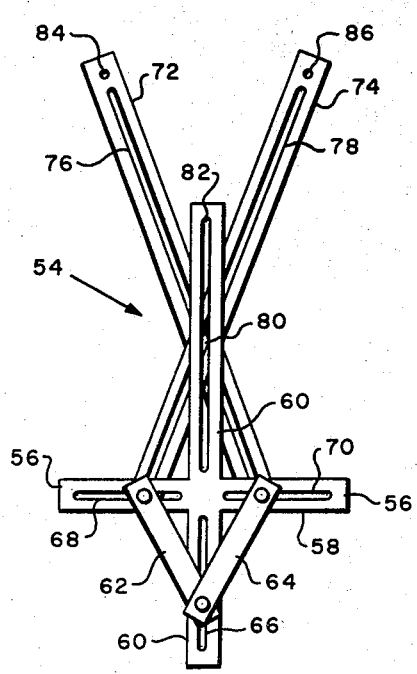
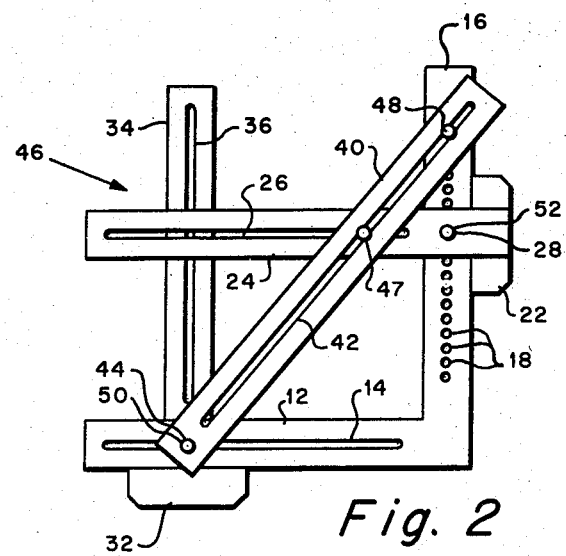
INVENTOR.
WALTER GRZYWACZ
ATTORNEYS

United States Patent Office 2,881,522
Patented Apr. 14, 1959

2,881,522

MECHANICAL DEVICE FOR DRAWING A HYPERBOLIC CURVE

Walter Grzywacz, Southampton, Pa.

Application March 28, 1956, Serial No. 574,571

4 Claims. (Cl. 33—27)

(Granted under Title 35, U. S. Code (1952), sec. 266)

The invention described herein may be manufactured and used by or for the Government of the United States of America for governmental purposes without the payment of any royalties thereon or therefor.

The present invention relates to a mechanical device for locating points on a hyperbolic curve and more particularly to a curve scribing device capable of continuously constructing a hyperbolic function.

A hyperbolic curve is one which is the locus of all points having a constant difference in distances from a pair of points which are known as the foci or focal points of the curve. The technique most commonly in use today for drawing a hyperbolic curve is known as the string and tack method. In this method, a pair of tacks is located in the positions of the foci of the curve. A string is drawn over the tacks and a pencil is tied to one point on the string to give the proper difference in distances between the pencil and the focal points. By letting out both ends of the string simultaneously, the pencil traces a hyperbolic curve on the surface below.

The disadvantages of the string and tack method described above reside in the fact that the curve drawn is irregular and inaccurate due to the necessity to maintain a constant tension on both portions of the string at the same time. To do this under the best of conditions requires a great deal of skill on the part of the operator. When the hyperbolic curve is being drawn aboard an aircraft or other craft subject to inertial effects, this becomes a practical impossibility. Present mechanical devices designed for drawing hyperbolic curves are generally cumbersome, complicated, expensive, and somewhat difficult to use.

The present invention proposes the use of a relatively simple mechanical linkage capable of use by an operator to draw a hyperbolic curve. The device may also be used as part of a larger system, such as a computer device, for producing voltages representing the $x$ and $y$ coordinates of points on the hyperbolic curve. The mechanical arrangement herein described is relatively simple in construction and capable of producing very accurate hyperbolic curves.

An object of the present invention is the provision of a mechanical linkage for describing hyperbolic curves.

Another object is to provide a mechanical arrangement simple in construction for use in locating points on a hyperbolic curve.

The final object of this invention is the provision of a mechanical drafting device which by manual manipulation will scribe continuously a curve which follows a hyperbolic function.

The exact nature of this invention as well as other objects and advantages thereof will be readily apparent from consideration of the following specification relating to the drawings in which:

Figs. 1a, 1b, 1c, and 1d show the individual component elements of a sub-assembly of the inventive device.

Fig. 2 illustrates the sub-assembly comprised of the elements shown in Figs. 1a, 1b, 1c, and 1d.

Fig. 3 illustrates another sub-assembly included in the inventive device.

Figure 4:
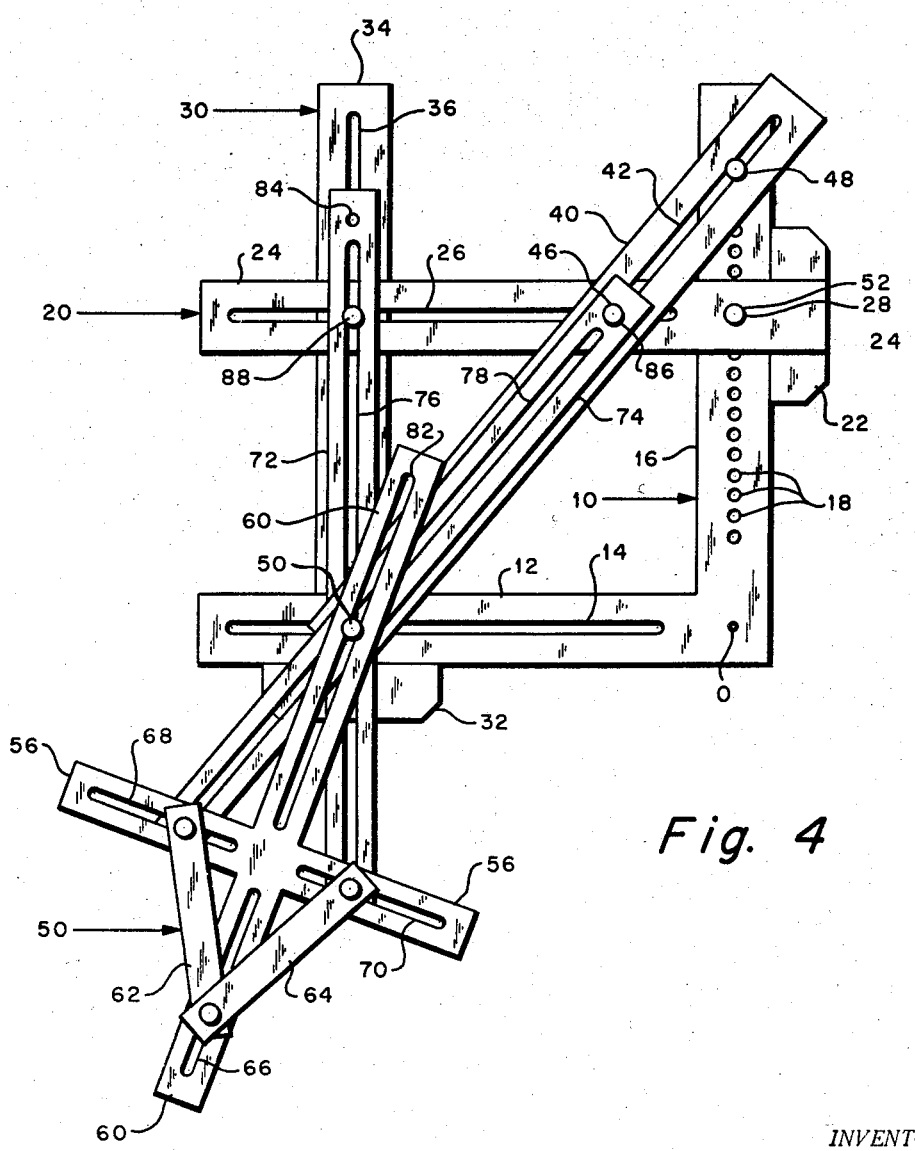
Fig. 4 shows the sub-assemblies of Figs. 2 and 3 combined to form one embodiment of the instant invention.

Referring now to the drawings, wherein like reference characters designate like or corresponding parts throughout the several views, there is shown in Figs. 1a through 1d, the various individual elements which together comprise a sub-assembly of this invention. Fig. 1a shows square member 10 having along its bottom leg 12 a slot 14 and along its side leg 16 a plurality of aligned holes 18 which are uniformly spaced at designated intervals. Slot 14 is arranged perpendicularly to the row of holes 18. Fig. 1b shows a parallel T 20 having end piece 22 and the transverse extension arm 24. Transverse extension arm 24 is provided with a slot 26 axially aligned with a hole 28 for reasons explained further below. Fig. 1c shows a perpendicular T 30 which may be similar or identical to T 20 of Fig. 1b. T 30 also is provided with an end 32, a transverse extension 34 with a slot 36, and a hole 38 aligned with slot 36. Fig. 1d shows diagonal bar 40 having a slot 42 and a hole 44 aligned therewith. The various elements shown in Figs. 1a, 1b, 1c, and 1d are grouped to form sub-assembly 46 shown in Fig. 2. It will be seen that T's 20 and 30 may be made slidable with respect to their respective legs of square 10. Holes 28 and 38 of their respective T's match up with a hole 18 in leg 16 and slot 14 in leg 12, respectively.

It will be seen from the details of the elements in Figs. 1a through 1d and in sub-assembly 46 of Fig. 2 that extension arm 24 may be positioned along leg 16 so that it is always perpendicular to leg 16 and parallel to bottom leg 12 of square 10. In a like manner, extension arm 34 is maintained always parallel and perpendicular to legs 16 and 12, respectively.

Diagnal bar 40 is placed across T's 30 and 20 in the manner shown, while a pin 47 through slots 42 and 26 and hence, slidable relative to both the T 20 and the bar 40, is continuously constrained to remain at the intersection of these elements as they are relatively displaced. Thus, pin 47 comprises an adjustably positioned point reference means which may be utilized in the manner described further below for implementing the instant invention. A pin 48 passing through a selected hole 18 in leg 16 and slot 42 may be utilized to maintain the slot 42 over said selected hole 18. Another pin 50 passing through hole 44 of bar 40, slot 14 and hole 38 may be provided to maintain proper cooperation at this point. In addition, in a manner to be described further below, the position of arm 24 is fixed with respect to leg 16 by the insertion of a pin 52 through hole 28 and another selected hole 18 in leg 16. Arm 34 is permitted to slide along 12, thereby permitting movement of pins 50 and 47. Pins 48 and 52, of course, are fixed to their respective holes 18.

Fig. 3 shows sub-asembly 54 consisting of a cross member 56 composed of a pair of right angled legs 58 and 60. A pair of diagonal arms 62 and 64 of equal length are linked at one end to ride in slot 66 and separately at their other ends in slots 68 and 70, respectively. A pair of arms 72 and 74 are pinned at their first ends with the free ends of arms 62 and 64 to slide in their respective slots 68 and 70. Arms 72 and 74 are provided with slots 76 and 78, respectively. The pin 50 engaged in slot 82 of leg 60 at the point 80 maintains arms 72 and 74 in a crossed position along slot 82. The free ends of arms 72 and 74 are provided with holes or openings 84 and 86, respectively, which are aligned with their respective slots. These holes are equidistant from the opposite ends of their respective arms.

In Fig. 4 the sub-assemblies of Figs. 2 and 3 are shown assembled to form one embodiment of the inventive device for drawing a hyperbolic curve. In assembling the two sections, arm 74 is placed over, and in alignment with, diagonal 40, so that pin 47 is passed through hole 86 as well as slots 42 and 26. Arm 72 is placed over extension 34 of T 30 in axial alignment therewith. A pin 88 passing through slots 76, 26, and 36 helps to maintain this relationship. Therefore, slots 76 and 78 intersect over the intersection of slot 14 and hole 38 at a common point 80 permitting the pin 50 to pass through all of these. A pencil or any member passing through hole 84 of arm 72 will pass through slot 36 at all times, and for reasons to be explained below, will trace the hyperbolic curve.

Figure 5:
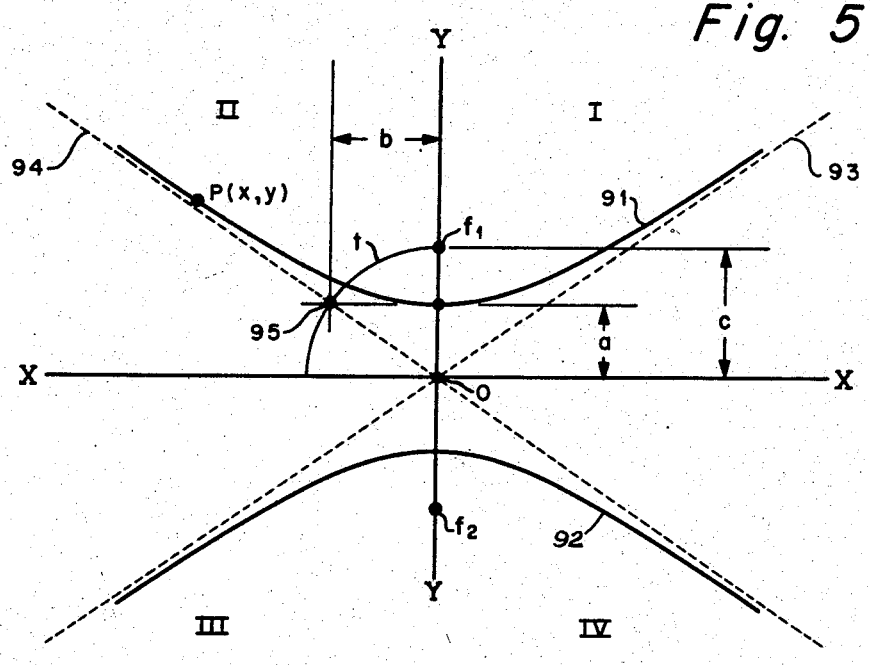
Fig. 5 illustrates a typical hyperbolic function with its characteristics defined.

Before describing in further detail how the constants of the hyperbolic curve to be drawn are set up in the mchanical device illustrated in Fig. 4, a theoretical discussion describing the action of the device in tracing a hyperbolic curve follows:

Fig. 5 illustrates a hyperbolic curve following the formula $$\frac{y^2}{a^2} - \frac{x^2}{b^2} = 1$$

The curve consists of a pair of traces 91 and 92 and a pair of respective asymptotes 93 and 94. The distance $a$ from the origin O to the point at which one of the two halves of the hyperbolic curve intersects the Y axis is called the semi-transverse axis. The points $f_1$ and $f_2$ described as the foci or focal points of the hyperbolic curve are separated by what is termed the focal length or distance of the hyperbola. The distance $c$ from the origin O to focal point $f_1$ is one-half this distance. If a circular arc through $f_1$ is drawn with O as the center, a point 95 on asymptote 94 is located by the intersection therewith. Point 95 also lies on a tangent to trace 91 drawn at the point where trace 91 intersects the Y axis. The abscissa $b$ of point 95 is defined as the semi-conjugate axis of the hyperbolic curve illustrated. It may be shown that $a$, $b$, and $c$ are related by $a^2+b^2=c^2$. This may be shown as follows:

The equation of the circle including point 95 is:

$$x^2+y^2=c^2$$

If $x=b$ and $y=a$ then $$a^2+b^2=c^2, \text{ QED}$$

Selecting a point P on the curve having the abscissa $x$ and the ordinate $y$, by the definition of a hyperbola, the distance between point P and $f_1$ on the one hand and $f_2$ on the other hand differs by a constant value at all times while P is moved along the locus or trace 91 forming the curve.

Figure 6:
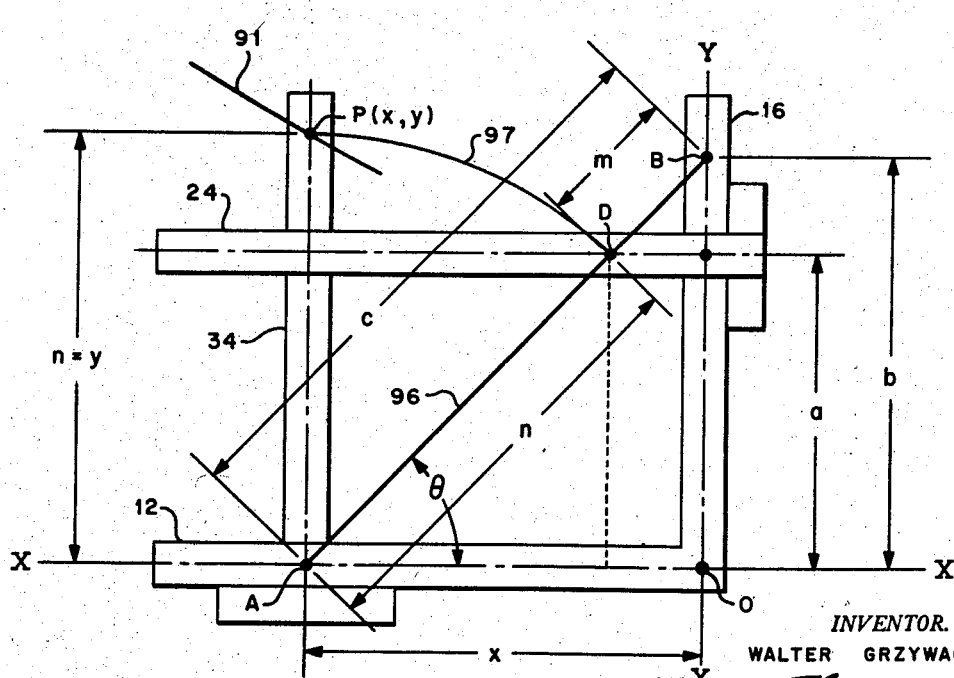
Fig. 6 shows schematically how the instant device is capable of locating points on a hyperbolic curve.

Referring to Fig. 6, square member 10 is set up with arms 24 and 34 set up parallel to legs 12 and 16, respectively. Instead of slots, center lines of the various elements are shown. A line 96, which would represent the center line of diagonal 40 if shown, is drawn between a point B on the center line of leg 16 designated as the Y axis, and a point A on the center line of leg 12, designated as the X axis. Point D designates the point at which line 96 intersects the center line of arm 24. Arm 24 is positioned at a distance $a$, which is the semi-transverse axis of the hyperbola to be drawn, from the center line of leg 12. Point B is located at a distance $b$, the semi-conjugate axis of the hyperbola, from the origin O which is at the intersection of the X and Y axes. Point A may be selected at any point along the X axis since it is the purpose of the arrangement to locate P on trace 91 at any arbitrary point or location of arm 34 along the X axis or leg 12.

The angle formed between line 96 and the X axis is designated $\theta$. The distances between B and D, and D and A are designated as $m$ and $n$, respectively.

As a general mathematic proposition, if $$\frac{P}{q} = \frac{S}{t}$$

then $$\frac{P}{P+q} = \frac{S}{S+t}$$

Applying this principle, and referring to Fig. 6, (1) if $$\frac{n}{m} = \frac{a}{b-a}$$

then $$\frac{n}{n+m} = \frac{a}{a+(b-a)} = \frac{a}{b}$$

(2)

$$n+m = \frac{nb}{a}$$

(3)

$$\sin \theta = \frac{b}{n+m} = \frac{b}{\frac{nb}{a}} = \frac{a}{n}$$

To locate the point, P($x,y$), draw a circular arc 97 from point D with A as center until the center line of extension 34 is intersected, then, (4)

$$\sin \theta = \frac{a}{n} = \frac{a}{y}$$

(5)

$$\cos \theta = \frac{x}{n+m} = \frac{xa}{nb} = \frac{x}{y}\frac{a}{b}$$

Since $\sin^2 \theta + \cos^2 \theta = 1$, then (6)

$$\frac{a^2}{y^2} + \frac{x^2}{y^2}\frac{a^2}{b^2} = 1$$

(7)

$$a^2 + \frac{x^2 a^2}{b^2} = y^2$$

and (8)

$$\frac{y^2}{a^2} - \frac{x^2}{b^2} = 1$$

which is the equation of a hyperbola.

Therefore, since P($x,y$) is a point on the hyperbola of semi-transverse axis $a$ and semi-conjugate axis $b$, it is only necessary to provide means of continuously constructing the point P($x,y$). Any device superimposed over the sub-assembly of Fig. 6 which will continuously locate P on T 30 at a distance AD from A as T 30 is moved along leg 12 will accomplish this purpose.

Sub-assembly 54 of Fig. 3, described above, can accomplish this function by maintaining the distances between points 80 and 86 on the one hand and between 80 and 84 on the other hand, always equal to each other. As will be understood from an examination of the sub-assembly 54 in Fig. 3, this is brought about by placing intersection 80 of the three members 60, 72 and 74 over pin 50 in Fig. 2 which is point A in Fig. 6, placing hole 86 in leg 74 over pin 47, and hole 84 of arm 72 over slot 36. A pencil placed through hole 84 and slot 36 will trace out the hyperbola in quadrant II as T 30 is moved along leg 12.

In order to utilize the device of Fig. 4 to trace any hyperbola desired, it is first necessary to set up the constants of the curve. T 20 is moved to a distance $a$, the semi-transverse axis of the curve, from O, and a pin or other locking device is utilized to fix the T at this position. Pin 48 passing through slot 42 of diagonal 40 is located at a distance $b$, the semi-conjugate axis of the curve, from point O. The device is now set up to trace the hyperbolic function as it appears in quadrant II.

In the case where the locations of the focal points are given instead of the semi-conjugate axis $b$, the latter may be determined by simple triangulation due to the relationship $c^2=a^2+b^2$, established above. Square 10 and diagonal 40 may be used for this purpose. Referring to Fig. 6, point A is located at a distance $a$ from origin O and B is located on the Y axis where the distance $AB=c$, one-half the focal distance of the hyperbola to be drawn. Then $b$ is located on the Y axis directly where required.

Thus, there has been provided a mechanical device suitable for use in drafting equipment which is capable of drawing a hyperbolic curve with ease, great accuracy and simplicity. While the particular device shown has been demonstrated in connection with the portion of the curve in quadrant II, if it is desired to draw the first quadrant portion of the hyperbolic curve it is only necessary to flop the device over along leg 16 of square 10 so as to provide the other symmetrical piece of the hyperbolic curve. If it is desirable to provide a device which will draw continuously both quadrants of the curve then, of course, square 10 may be modified with another leg extending opposite the first leg and similar sections and legs which will continuously provide the curve on the other side of the Y axis. It is also understood that if the equation of the hyperbolic curve is such that it is displaced from the origin, it is only necessary to move the origin O, that is the whole device, up to the center or new origin of the hyperbolic curve to be drawn. Thus, point O on square 10 is always located at the physical center of the hyperbola which is the origin in Fig. 3 of the particular hyperbolic function shown.

Although the instant device has been described in terms of a drawing instrument which may be utilized for describing hyperbolic curves, it is understood that this device may in addition be utilized as part of a broader system or computing device. For example, the pencil passing through hole 84 in sub-assembly 54 and slot 36 in T 30 may be replaced by means connected to a wiper on a potentiometer while a motor may drive T 30 which is also connected to a wiper on a potentiometer in the system. In this manner the instant device may be utilized to produce a series of voltages representing the coordinate points on the hyperbolic curve which is scribed by the device. If this device is used in such a system, it is necessary merely to set up the initial requirements in the device by properly locating diagonal member 40 and T 20. In addition, of course, such signals may be directly fed into another section of the system for their use in some particular manner desired by or built into the system. Furthermore, if the device is used solely as part of such a system, sub-assembly 54 in Fig. 3 may be eliminated altogether. Since it is the distance AD in Fig. 6 which is required as the ordinate of $P(x,y)$, this distance may be measured or indicated directly.

Many other modifications and variations of the present invention are possible in the light of the above teachings. Instead of utilizing the center lines of the various elements as the various axes and principal points, the inside or outside edges might be more appropriate under certain circumstances. Wires under tension may be substituted for the linkages themselves, or the linkages themselves may be provided with conventional means for indicating their respective positions electrically. It is, therefore, to be understood that within the scope of the appended claims the invention may be practiced otherwise than as specifically described.

What is claimed is:

1. A device for locating points on a hyperbolic curve comprising, in combination, an L-shaped member having first and second elongated legs perpendicular to each other, the intersection of which is positioned coincident with the center of said hyperbolic curve, a first elongated member slidable with respect to said first leg and constrained to be continuously positioned parallel to said second leg, a second elongated member fixed to said second leg at a selective point and disposed parallel to said first leg, a first pivot means attached to said first member at the intersection thereof with said first leg, a second pivot means fixedly secured to said second leg at a predetermined point thereon, an extended member pivotally connected to said first and said second pivot means and slidable relative to at least one of said first and said second pivot means, said extended member extending diagonally across the second leg of said L-shaped member and intersecting said second member, a third pivot means slidably engaging both said second member and said extended member continuously positioned at the intersection of said second member and said extended member, and means continuously responsive to the position of said first pivot means and the distance between said first and said third pivot means to determine coordinates on said hyperbolic curve.

2. A device for locating points on a hyperbolic curve comprising, in combination, an L-shaped member having first and second elongated legs perpendicular to each other, the intersection of which is positioned coincident with the center of said hyperbolic curve, a first elongated member slidable with respect to said first leg and constrained to be continuously positioned parallel to said second leg, a second elongated member fixed to said second leg at a selective point and disposed parallel to said first leg, a first pivot means attached to said first member at the intersection thereof with said first leg, a second pivot means fixedly secured to said second leg at a predetermined point thereon, an extended member pivotally connected to said first and said second pivot means and slidable relative to at least one of said first and said second pivot means, said extended member extending diagonally across the second leg of said L-shaped member and intersecting said second member, a third pivot means slidably engaging both said second member and said extended member continuously positioned at the intersection of said second member and said extended member, and transfer means operatively interconnecting said first pivot means, said third pivot means and an arm slidable longitudinally of said first elongated member arranged to continuously position said arm in response to the distance between said first and said third pivot means as said first elongated member is moved slidably along said first leg, so that a fixed point on said arm passes through successive points on said hyperbolic curve.

3. A device for locating points on a hyperbolic curve comprising, in combination, an L-shaped member having first and second elongated legs perpendicular to each other, the intersection of which is positioned coincident with the center of said hyperbolic curve, a first elongated member slidable with respect to said first leg and constrained to be continuously positioned parallel to said second leg, a second elongated member fixed to said second leg at a selective point and disposed parallel to said first leg, a first pivot means attached to said first member at the intersection thereof with said first leg, a second pivot means fixedly secured to said second leg at a predetermined point thereon, an extended member pivotally connected to said first and said second pivot means and slidable relative to at least one of said first and said second pivot means, said extended member extending diagonally across the second leg of said L-shaped member and intersecting said second member, a third pivot means slidably engaging both said second member and said extended member continuously positioned at the intersection of said second member and said extended member, and transfer means including a first elongated arm slidably engaging said first pivot means and maintained in alignment longitudinally of said extended member by pivotal engagement of one end of said first arm with said third pivot means, a second elongated arm slidably engaging said first pivot means and having locating means at one end thereof for establishing successive points on said hyperbolic curve, restraining means slidably interconnecting said first elongated member and said second elongated arm for maintaining said second arm in alignment longitudinally of said first member, and arm positioning means slidably engaging said first pivot means and operatively interconnecting the other ends of said first and said second elongated arms for continuously positioning said locating means at a distance from said first pivot means equal to the distance of said third pivot means from said first pivot means.

4. A device for locating points on a hyperbolic curve comprising, in combination, an L-shaped member having first and second elongated legs perpendicular to each other, the intersection of which is positioned coincident with the center of said hyperbolic curve, a first elongated member slidable with respect to said first leg and continuously positioned parallel to said second leg, a second elongated member fixed on said second leg at a distance along said second leg from the intersection with said first leg equal to the semi-transverse axis of said curve and disposed parallel to said first leg, a pivotal connecting means attached to said first elongated member at the intersection thereof with said first leg, an extended member pivotally connected to said first elongated member by said pivotal connecting means, said extended member extending diagonally across the second leg of said L-shaped member and intersecting said second elongated member, means fixedly secured to said second leg and slidably engaging said extended member for maintaining the intersection of said extended member with said second leg at a distance along said second leg from the intersection with said first leg equal to the semi-conjugate axis of said curve, point reference means slidably engaging both said second member and said extended member continuously positioned at the intersection thereof, said first elongated member and said extended member pivotally connected to said first member being movable together along the length of said first leg, and means for establishing a distance along said first elongated member measured from said pivotal connecting means equal to the distance along said extended member between said pivotal connecting means and said reference means, for tracing points on said hyperbolic curve.

References Cited in the file of this patent

UNITED STATES PATENTS

| 614,259 | Bouldry | Nov. 15, 1898 |
| 2,463,788 | McGuckin | Mar. 8, 1949 |

FOREIGN PATENTS

| 535,215 | France | Jan. 20, 1922 |
| 407,092 | Germany | Dec. 12, 1924 |